(12) United States Patent
Flemming et al.

(10) Patent No.: US 8,453,122 B2
(45) Date of Patent: May 28, 2013

(54) SYMMETRIC MULTI-PROCESSOR LOCK TRACING

(75) Inventors: Diane Garza Flemming, Pflugerville, TX (US); Eric Philip Fried, Austin, TX (US); Greg R. Mewhinney, Austin, TX (US); David Blair Whitworth, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 12/616,005

(22) Filed: Nov. 10, 2009

(65) Prior Publication Data

US 2011/0113406 A1 May 12, 2011

(51) Int. Cl.
*G06F 9/44* (2006.01)
(52) U.S. Cl.
USPC ........................................................ 717/128
(58) Field of Classification Search
None
See application file for complete search history.

(56) References Cited

U.S. PATENT DOCUMENTS

| | | | |
|---|---|---|---|
| 5,774,377 | A | 6/1998 | Eidson |
| 6,735,758 | B1 | 5/2004 | Berry |
| 7,165,190 | B1 | 1/2007 | Srivastava |
| 7,424,646 | B2* | 9/2008 | Smith ............................. 714/45 |
| 7,512,954 | B2 | 3/2009 | Srivastava |
| 8,141,050 | B2* | 3/2012 | Farchi et al. .................. 717/127 |
| 2002/0010882 | A1* | 1/2002 | Yamashita ....................... 714/45 |
| 2003/0208662 | A1* | 11/2003 | Heisch ........................... 711/152 |
| 2006/0031658 | A1* | 2/2006 | Swanberg et al. ................ 712/1 |
| 2007/0067777 | A1* | 3/2007 | Branda et al. .................. 718/107 |
| 2008/0059673 | A1* | 3/2008 | Mehaffy et al. ............... 710/200 |
| 2008/0184257 | A1* | 7/2008 | Olszewski et al. ............ 718/105 |
| 2009/0044176 | A1* | 2/2009 | Cascaval et al. .............. 717/128 |
| 2009/0106741 | A1* | 4/2009 | Dageville et al. ............. 717/128 |
| 2011/0067008 | A1* | 3/2011 | Srivastava et al. ............ 717/128 |

OTHER PUBLICATIONS

Hsu—"Proceedings of BSCD on '03"—USENIX Advanced Computing Systems Association pp. 1-7 (Aug. 12, 2003).
Love—"Kernel Locking Techniques"—http://james.bond.edu.au/courses/inft73626@033/Assigs/Papers/kernel_locking_techniques.html, pp. 1-6 (Aug. 2002).
Starke—"Locking in OS Kernels for SMP"—Technical University Berlin Communication and operation Systems Group, pp. 1-37 (Oct. 1, 2006).
Wisniewski—"Efficient, Unified, and Scalable Performance Monitoring for Multiprocessor Operating Systems"—Proceedings of the 2003 ACM/IEEE Conference on Supereomputing. pp. 1-14 (Nov. 2003).

* cited by examiner

*Primary Examiner* — Wei Zhen
*Assistant Examiner* — Adam R Banes
(74) *Attorney, Agent, or Firm* — David Mims; Mark P Kahler

(57) ABSTRACT

A symmetric multi-processor SMP system includes an SMP processor and operating system OS software that performs automatic SMP lock tracing analysis on an executing application program. System administrators, users or other entities initiate an automatic SMP lock tracing analysis. A particular thread of the executing application program requests and obtains a lock for a memory address pointer. A subsequent thread requests the same memory address pointer lock prior to the particular thread release of that lock. The subsequent thread begins to spin waiting for the release of that address pointer lock. When the subsequent thread reaches a predetermined maximum amount of wait time, MAXSPIN, a lock testing tool in the kernel of the OS detects the MAXSPIN condition. The OS performs a test to determine if the subsequent thread and address pointer lock meet the list of criteria set during initiation of the automatic lock trace method. The OS initiates an SMP lock trace capture automatically if all criteria or the arguments of the lock trace method are met. System administrators, software programmers, users or other entities interpret the results of the SMP lock tracing method that the OS stores in a trace table to determine performance improvements for the executing application program.

16 Claims, 3 Drawing Sheets

TRACE TABLE 200

| | TRACE PARAMETER | TRACE PARAMETER DATA |
|---|---|---|
| 1 | LOCKS TO TRACE | LOCK A, LOCK B |
| 2 | TRACE BUFFER SIZE | 100 MB |
| 3 | MAX TRACES PER DAY | 100 |
| 4 | MAX TRACES PER LOCK | 20 |
| 5 | MAX TOTAL TRACES | 1000 |
| 6 | TRACE 1 DATE/TIME | DATE/TIME INFORMATION |
| 7 | TRACE 2 DATE/TIME | DATE/TIME INFORMATION |
| ⋮ | | |
| 8 | TRACE M DATE/TIME | DATE/TIME INFORMATION |
| 9 | NUMBER OF TRACES TAKEN | 25 |
| 10 | LOCK 1 NUMBER OF TRACES | 15 |
| 11 | LOCK 2 NUMBER OF TRACES | 10 |
| ⋮ | | |
| 12 | LOCK L NUMBER OF TRACES | 10 |

FIG. 2

TRACE TABLE

200

| | 210 | 220 TRACE PARAMETER | 230 TRACE PARAMETER DATA |
|---|---|---|---|
| 240 | 1 | LOCKS TO TRACE | LOCK A, LOCK B |
| | 2 | TRACE BUFFER SIZE | 100 MB |
| | 3 | MAX TRACES PER DAY | 100 |
| | 4 | MAX TRACES PER LOCK | 20 |
| | 5 | MAX TOTAL TRACES | 1000 |
| 250 | 6 | TRACE 1 DATE/TIME | DATE/TIME INFORMATION |
| | 7 | TRACE 2 DATE/TIME | DATE/TIME INFORMATION |
| | | ⋮ | |
| | 8 | TRACE M DATE/TIME | DATE/TIME INFORMATION |
| | 9 | NUMBER OF TRACES TAKEN | 25 |
| | 10 | LOCK 1 NUMBER OF TRACES | 15 |
| | 11 | LOCK 2 NUMBER OF TRACES | 10 |
| | | ⋮ | |
| | 12 | LOCK L NUMBER OF TRACES | 10 |

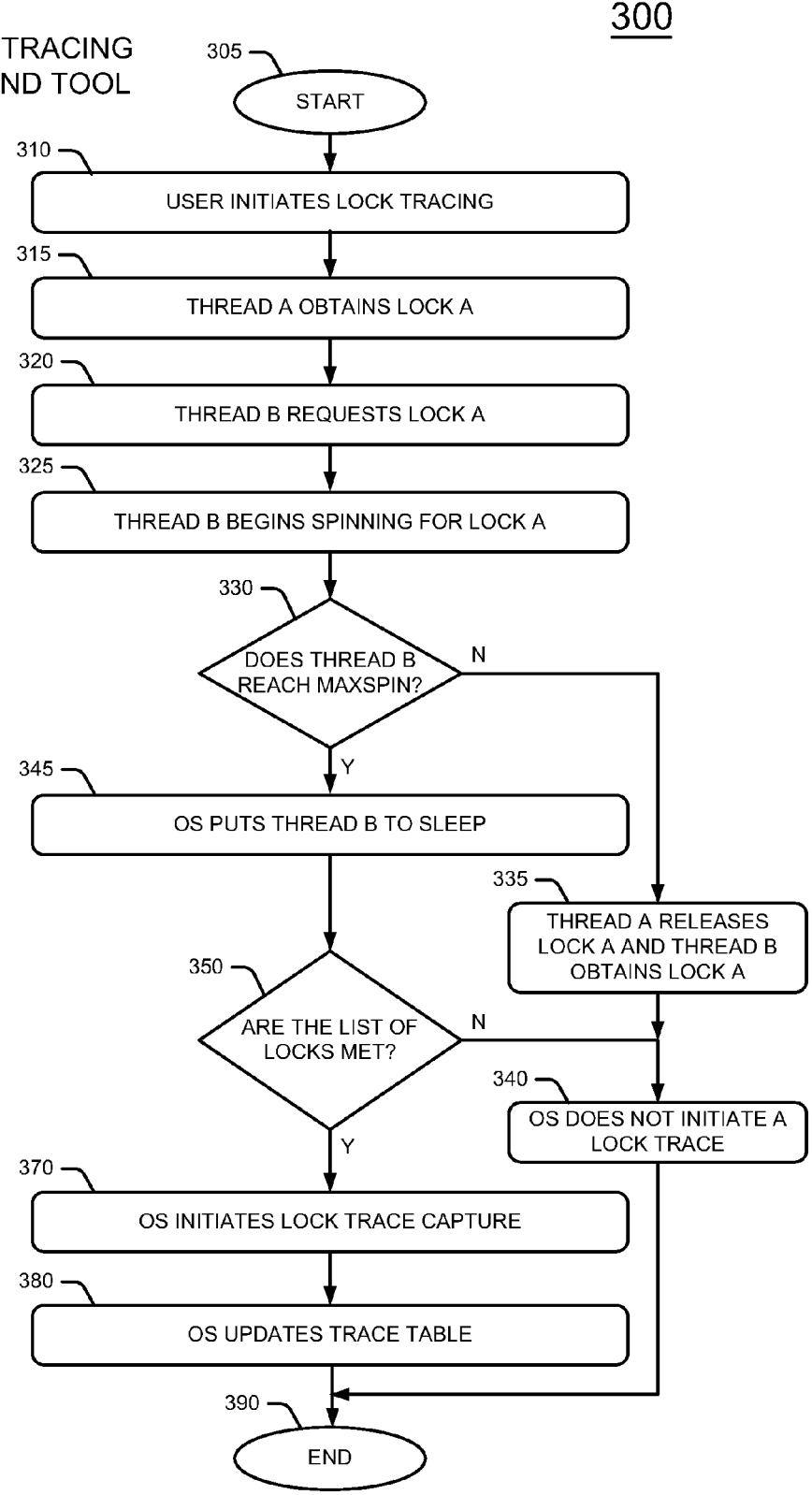

SYMMETRIC MULTI-PROCESSOR LOCK TRACING

BACKGROUND

The disclosures herein relate generally to information handling systems (IHSs), and more specifically, to IHSs that include lock tracing capability for software performance analysis.

Optimizing software application program performance on modern information handling systems (IHSs) is often a complex process. This optimization of application programs frequently requires extensive testing. One useful test includes software lock tracing of processes or threads of a processor in a multi-processor design, such as a symmetric multi-processor (SMP) information handling system (IHS). System administrators, software programmers or other users may desire evaluation of software locks that occur when multiple processes require access to particular data or a particular memory address pointer. During a software lock, users may desire performance information about a lock that requires the expenditure of significant system resources. During a software lock, users may run a lock tracing program to capture system information that may assist users in understanding the software lock in greater detail.

One method that system administrators, software programmers, users, or other entities use for software lock tracing includes manually initiating a lock tracing program at a particular point during the execution of an application program on a particular processor system, such as a symmetric multi-processor (SMP) IHS. The lock tracing program may provide users with information such as those memory address pointers that an SMP IHS locks during execution of processes or threads. The lock tracing program may also determine the duration of time that the lock is in place, how many times the lock occurs during a given period of time and many other lock tracing parameters. In this manner, users may evaluate the lock tracing software information in a desire to improve the performance of the execution of an application program. In an SMP system, SMP lock traces provide users with details of performance problems that a particular application program encounters during execution within an SMP IHS. Software lock tracing may consume substantial resources, such as operating system (OS) software resources of the SMP IHS during application program execution.

BRIEF SUMMARY

Accordingly, in one embodiment, a method of testing is disclosed that includes determining, by a lock testing tool, when a particular thread of an executing program in a multi-processor system reaches a predetermined spin threshold. The method also includes commencing, by the lock testing tool, a lock trace operation in response to the particular thread reaching the predetermined spin threshold.

In another embodiment, an information handling system (IHS) is disclosed that includes a multi-processor system. A memory couples to the multi-processor system. The memory is configured with a lock tracing tool that determines when a particular thread of an executing program in the multi-processor system reaches a predetermined spin threshold. The lock tracing tool commences a lock trace operation in response to the particular thread reaching the predetermined spin threshold.

In yet another embodiment, a computer program product is disclosed. The computer program product is stored on a computer operable medium. The computer program product includes instructions that determine when a particular thread of an executing program in a multi-processor system reaches a predetermined spin threshold. The computer program product also includes instructions that commence a lock trace operation in response to the particular thread reaching the predetermined spin threshold.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 2 is a block diagram showing details of a representative trace table data that the disclosed SMP lock tracing methodology employs.

FIG. 3 is a flowchart that depicts process flow within the IHS of FIG. 1 as it employs the disclosed SMP lock tracing methodology.

DETAILED DESCRIPTION

Figure 1:
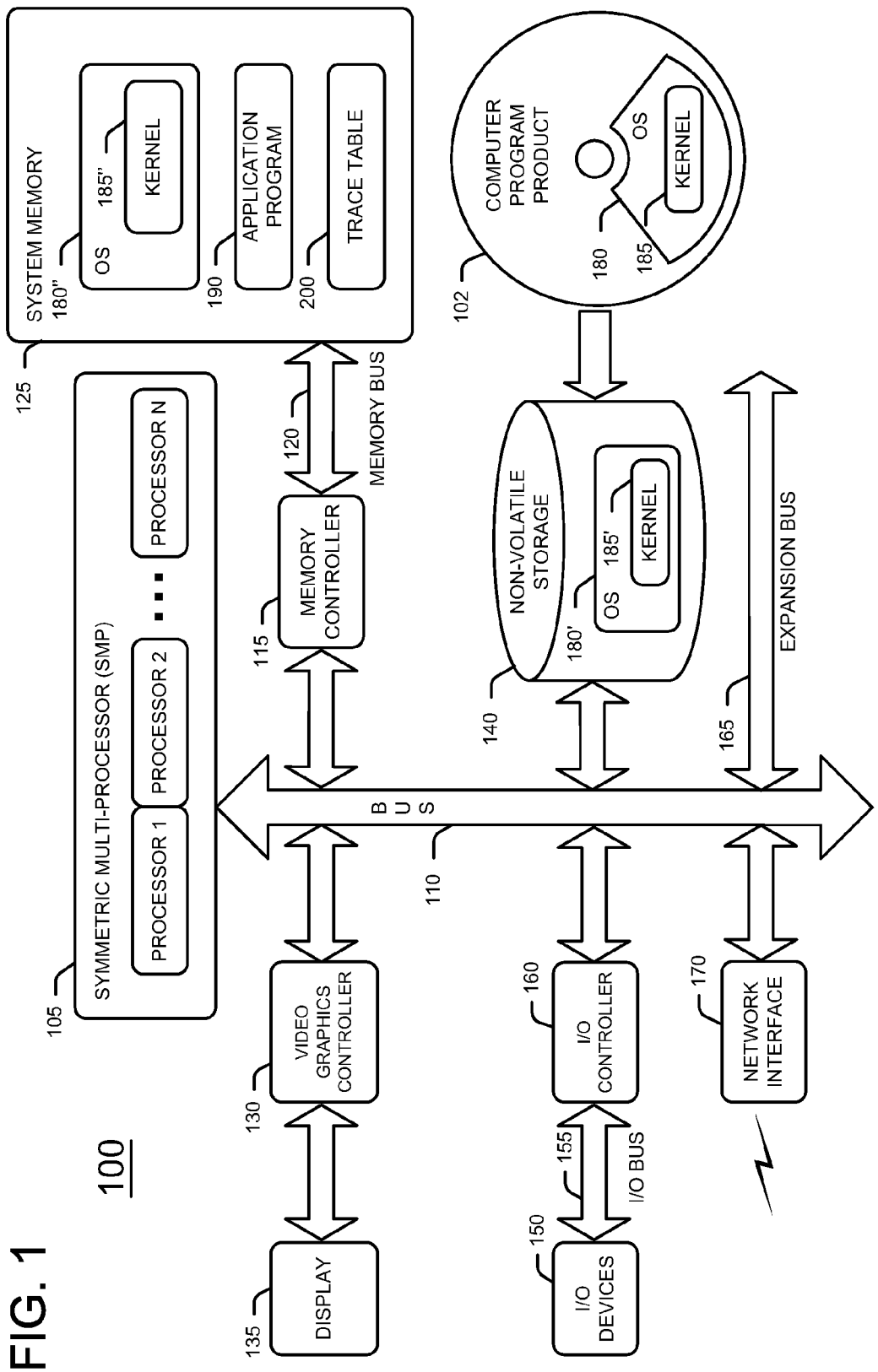
FIG. 1 is block diagram of an information handling system (IHS) that includes the disclosed SMP lock tracing methodology.

One embodiment of the disclosed information handling system (IHS) employs an operating system (OS) that executes lock tracing software. Optimizing software performance on an IHS, such as a server with a large number of CPUs, processors, or processor cores may be particularly challenging to users. One system that encounters such difficulties is a symmetric multi-processor (SMP) system. An SMP system includes multiple processors or processor cores that each share a common memory or data storage mechanism. SMP software locks may present performance limitations to application programs executing on an SMP IHS.

SMP locks offer a complicated challenge to users seeking to understand the various relationships between multiple processors, multiple threads, and multiple locks or requests for data address pointers. A lock typically occurs when a thread makes a request to read, write or modify data at a particular memory location. Operating system (OS) software provides a lock to ensure that one and only one thread at a time owns or controls a particular data memory address pointer. In that manner, an OS avoids multiple thread collisions of a particular memory address pointer and thus avoids collisions at a particular memory location. Without proper locks, one thread may modify a particular memory location while a subsequent thread modifies that same particular memory location out of turn.

Software tools, such as lock tracing software, capture traces of application programs while those application programs execute in an SMP system to provide details on the particular SMP locks that may limit performance. Using lock tracing tools to analyze locking problems that are easy to reproduce is straightforward. However, predicting intermittent SMP locking problems presents users with significant challenges. One method users may employ to capture intermittent lock problems is for users to apply continuous lock tracing. Continuous lock tracing may provide users with performance improvement information. However, lock traces may contain vast quantities of detailed information and thus create very large lock tracing data in a short period of time, thus making this method undesirable. For example, lock tracing consumes multiple processor cycles and degrades the performance of the system under test, such as an SMP IHS. Lock tracing also generates large trace output files. Trace buffer memory would typically fill long before an intermittent problem occurs for capture if a user employs continuous lock tracing.

The disclosed method to solve the above problems includes initiating a lock trace automatically when a particular problem occurs. One embodiment described below provides an automatic trigger of a lock trace capture when a problem lock occurs. The same SMP lock tracing method automatically releases or ends the lock trace when the problem resolves or closes. For example, when a process or thread desires a lock on a particular memory address pointer, such as memory pointer A, the process or thread desires to lock A. If the OS cannot provide a lock A, the thread requesting that lock begins to spin or hold until that lock is available. The OS may measure the amount of time a particular thread spins or waits for a lock to clear.

When the OS determines that a thread spins or waits for a predetermined maximum amount of time, that thread reaches "MAXSPIN". The OS employs an upper threshold "MAX-SPIN" that allows a thread to spin, i.e. wait for a lock to become available. In response to the thread reaching the threshold "MAXSPIN", the OS or other element of the IHS will put the spinning thread to sleep. Putting threads to sleep after reaching MAXSPIN indicates a lock trace performance problem and provides an effective trigger point to automatically begin lock trace data capture.

As shown in Table 1 below, a system administrator or other entity may enter an "autolocktrace" command line entry, at a keyboard or other input device of the SMP IHS. The autolocktrace command enables lock tracing for a particular lock, such as lock A. For example, when more than one thread requires lock A, the second or subsequent thread begins to spin or wait until that lock A is available or the subsequent thread sleeps.

TABLE 1

| Lock trace command | autolocktrace, arg 1, arg 2, . . . arg P |
|---|---|
| Disable lock trace command | autolockdisable |

The autolocktrace command may include multiple arguments, such as arg 1, arg 2, . . . arg P wherein P corresponds to the total number of arguments in the autolocktrace command. As described in more detail below in FIG. 2, the autolocktrace arguments may include input to the disclosed SMP lock tracing method for a variety of lock trace parameters. For example, one such argument may include the particular lock or locks to trace, such as lock A or other lock. Other arguments include trace buffer size and a maximum number of traces to execute per day or other time period. Other arguments may include maximum traces per lock and the maximum number of total traces. Other arguments and variations on the above arguments are possible within the scope of the autolocktrace command to support lock tracing of a program application during execution. Representative lock tracing arguments are described below in more detail with reference to FIG. 2. Table 1 also shows a disable lock trace command, or command switch, namely "autolockdisable" that, in response to user input, disables the autolocktrace feature after initiation of the autolocktrace feature by the autolocktrace command.

Entry of the lock trace command "autolocktrace" puts the OS in position to automatically trigger and commence lock tracing in response to the occurrence of a MAXSPIN condition. In one embodiment, without this command, the automatic lock tracing does not occur. MAXSPIN occurs when a particular thread waits or spins for a predetermined amount of time that the operating system OS determines as MAXSPIN.

A particular OS may designate a MAXSPIN number in micro-seconds, seconds or other predetermined criteria. In other embodiments of the disclosed SMP lock tracing method, the OS may employ multiple MAXSPIN time counts to associate with particular threads, locks, or other criteria.

When a particular thread reaches its respective predetermined MAXSPIN value, the OS puts that particular thread to sleep by registering that particular thread with an event list. The event list provides the thread with the ability to later awaken when the lock requirements of that thread are met or freed up. In one embodiment, the autolocktrace command allows the OS to monitor the event list for those threads that register therewith and perform the actions that the arguments of the autolocktrace command request. The OS may employ an OS kernel to monitor thread status, such as MAXSPIN, to support the disclosed SMP lock tracing method.

FIG. 1 shows a symmetric multi-processor (SMP) information handling system (IHS) as an SMP system 100 that may employ the disclosed SMP lock tracing method. In that case, the SMP system 100 carries out the functional blocks of the flowchart of FIG. 3, described below, that apply to the SMP lock tracing performance evaluation process.

SMP IHS 100 includes a symmetric multi-processor 105 that couples to a bus 110. SMP 105 may include multiple processors, such as processor 1, processor 2 . . . processor N, wherein N is the total number of processors. Each processor may include multiple central processing units (CPU)'s or cores. In this manner, SMP 105 enables the execution of multiple processes or threads within one or more application software programs, such as application program 190.

A memory controller 115 couples to bus 110. A memory bus 120 couples system memory 125 to memory controller 115. System memory 125 is a form of memory store. A video graphics controller 130 couples display 135 to bus 110. SMP IHS 100 includes nonvolatile storage 140, such as a hard disk drive, CD drive, DVD drive, or other nonvolatile storage that couples to bus 110 to provide SMP IHS 100 with permanent storage of information. Nonvolatile storage 140 is a form of data store. I/O devices 150, such as a keyboard and a mouse pointing device, couple via an I/O bus 155 and an I/O controller 160 to bus 110.

One or more expansion busses 165, such as USB, IEEE 1394 bus, ATA, SATA, eSATA, PCI, PCIE and other busses, couple to bus 110 to facilitate the connection of peripherals and devices to SMP IHS 100. A network interface 170 couples to bus 110 to enable SMP IHS 100 to connect by wire or wirelessly to other network devices. SMP IHS 100 may take many forms. For example, SMP IHS 100 may take the form of a desktop, server, portable, laptop, notebook, or other form factor computer or data processing system. SMP IHS 100 may also take other form factors such as a personal digital assistant (PDA), a gaming device, a portable telephone device, a communication device or other devices that include a processor and memory.

SMP IHS 100 may employ a compact disk (CD), digital versatile disk (DVD), floppy disk, external hard disk or virtually any other digital storage medium as computer program product (CPP) 102. CPP 102 stores software including operating system (OS) 180 thereon. A user or other entity installs software such as OS 180 with kernel 185 on SMP IHS 100 prior to using application 190. The designations OS 180' and kernel 185' describe OS 180 and kernel 185 after installation in non-volatile storage 140 of SMP IHS 100. The designations OS 180" and kernel 185" describe OS 180 and kernel 185 after SMP IHS 100 loads the operating system OS with lock tracing capability software into system memory 125 for execution. Users may load application program 190 in system memory 125 from other sources such as from an external medium, external I/O bus 155 and network interface 170.

SMP IHS 100 includes an operating system (OS), such as OS 180 on storage 102 that enables processors or processor cores of the IHS to evaluate process or thread lock performance. More particularly, OS 180 includes a kernel 185 that facilitates OS 180 lock tracing capabilities for the disclosed SMP lock tracing method. For example, OS 180 employs kernel 185 to determine when a particular thread of an application program reaches the predetermined MAXSPIN threshold value when that application program executes on IHS 100. Kernel 185 activates in response to the command line entry of the autolocktrace command shown in Table 1 above. The kernel 185 may trigger an automatic lock trace to begin upon occurrence of a MAXSPIN event for a particular active process or thread of the executing application program. System memory 125 includes a representative application program 190 that system administrators, users, or other entities desire IHS 100 to execute for SMP lock evaluation purposes.

As will be appreciated by one skilled in the art, aspects of the lock tracing method of OS 180 may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as CPP 102 embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart of FIG. 3 illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIG. 3 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 3 described below.

The flowchart of FIG. 3 illustrates the architecture, functionality, and operation of possible implementations of systems, methods and computer program products according to various embodiments of the present invention. In this regard, each block in the flowchart of FIG. 3 may represent a module, segment, or portion of code, which comprises one or more executable instructions for implementing the specified logical function(s). It should also be noted that, in some alternative implementations, the functions noted in the block may occur out of the order noted in FIG. 3. For example, two blocks shown in succession may, in fact, be executed substantially concurrently, or the blocks may sometimes be executed in the reverse order, depending upon the functionality involved. It will also be noted that each block of FIG. 3 and combinations of blocks in the block diagrams and/or flowchart illustration, can be implemented by special purpose hardware-based systems that perform the specified functions or acts, or combinations of special purpose hardware and computer instructions.

System administrators, users or other entities may employ OS 180 of SMP IHS 100 during performance evaluation of application program 190 execution. In a multi-processor environment, multiple processes or threads of an application program very often request access to common information that system memory 125 or other memory storage areas maintain. For example, a particular thread A may obtain a lock A on address pointer A that points to an address in memory 125. That allows thread A to have full access to address pointer A data without concern for collision or overwriting by another or subsequent thread, such as thread B. If subsequent thread B requests the same lock, namely lock A, OS 180 does not allow subsequent thread B to obtain lock A and subsequent thread B spins until lock A is available. In this example lock A becomes a lock to share between particular thread A and subsequent thread B. The first thread that requests lock A receives that lock and any subsequent thread, such as thread B, obtains lock A after particular thread A releases that lock.

If subsequent thread B spins for an amount of time that OS 180 determines is equal to or greater than the predetermined value, MAXSPIN, then OS 180 puts thread B to sleep. This sleep condition is an example of a potential performance problem in the execution of application program 190. OS 180 employs kernel 185 to automatically detect a MAXSPIN condition and report that status to OS 180. If a system administrator, user, or other entity enables the autolocktrace command as shown above in Table 1, that MAXSPIN event may trigger a lock trace to begin. OS 180 evaluates the arguments of the autolocktrace command against the MAXSPIN event and determines if the trace parameters (FIG. 2) of the autolocktrace are met. In that case a lock trace begins and OS 180 monitors the particular lock condition and stores lock trace parameter data into trace table 200 as described in more detail below.

FIG. 2 shows a representative trace table 200 that SMP IHS 100 may employ during performance of the disclosed SMP lock tracing method. For example, OS 180 may store information that supports the SMP lock tracing method. Trace table 200 may include information as input into the disclosed SMP lock tracing method through the autolocktrace command of Table 1 as well as information results from the execution of the SMP lock tracing method. Column 210 of trace table 200 shows rows 1 through 12 of trace parameter information. Trace parameter data that populates trace table 200 is shown in column 220. The trace parameters of column 220 specify the conditions or parameters under which the autolocktrace operation executes according to the arguments of the autolocktrace command.

In one embodiment of the disclosed SMP lock tracing method, column 230 depicts trace parameter data for each of corresponding trace parameters of column 220. For example, in row 1 of trace table 200, trace parameter "locks to trace" indicates those locks of SMP IHS 100 that OS 180 monitors during application program 190 execution. In one example, as per column 230, row 1, "LOCK A, LOCK B" indicates that OS 180 will perform lock tracing on lock A and lock B during SMP IHS 100 execution of application program 190. In another embodiment of the SMP lock tracing method, parameter data in column 230, row 1 indicates a blank or no entry. In that case, OS 180 may interpret that lack of lock data as direction to perform lock tracing on all locks of application program 190 execution. In the above example, other locks, such as lock C or lock D (not shown) will not trigger a lock trace event since trace table 200 does not include those locks in row 1, column 230 trace parameter data.

Trace table 200 includes a trace parameter for "TRACE BUFFER SIZE" in row 2 and corresponding trace parameter data of "100 MB" as seen in column 230. In this example, SMP IHS 100 allocates 100 MB of total memory resources of system memory 125 for the collection of lock trace data during performance of the disclosed SMP lock tracing method. OS 180 may allocate a maximum number of lock traces to track in a given 24 hour period or day. For example, as shown in row 3 of trace table 200, trace parameter "MAX TRACES PER DAY" corresponds to a trace parameter data value of "100" traces. In this example, OS 180 may not exceed a total of 100 lock traces for application program 190 in a day of SMP IHS 100 lock trace evaluation.

In row 4, trace table 200 includes a "MAX TRACES PER LOCK" parameter. In one example, as shown in row 4 and column 230, OS 180 may include trace parameter data of "20". In that case, OS 180 executes lock tracing on application program 190 and stores or records no more than 20 traces for any particular lock. Trace table 200 includes a trace parameter of "MAX TOTAL TRACES" in row 5 with a corresponding trace parameter data value of "1000" as shown in row 5 and column 230. In that case, OS 180 will execute no more than 1000 traces during performance evaluation of application program 190 until reset, restart or other clearing action.

During execution or performance of the disclosed lock tracing method, OS 180 collects trace parameter data. For example, the time and date of each particular trace and other such trace parameter data may be valuable to the performance evaluation and eventual enhancement of application program 190. Trace table 200 includes a "TRACE 1 DATE/TIME" and corresponding "data/time information" in row 6 for trace parameter and trace parameter data, respectively. Trace table 200 row 6 data reflects information that OS 180 stores during the execution of the disclosed SMP lock tracing method. In this example, row 6 corresponds to the first lock trace that OS 180 encounters during execution of application program 190 and that may correspond to lock A, lock B, or any other particular lock. In other words, lock A, lock B, or other lock may be the first lock that application program 190 encounters during execution within SMP IHS 100.

After OS 180 captures the first lock trace data as "TRACE 1 DATE/TIME" shown in row 6, trace table 200 provides storage for date/time information for the next traces, namely "TRACE 2 DATE/TIME", as per row 7, . . . to "TRACE M DATE/TIME" as per row 8. In other words, trace table 200 stores date/time information for trace 1 through trace M as shown by rows 6 through 8, wherein M is the total number of traces stored in trace table 200 of FIG. 2. In other embodiments the number of rows, columns, or locations of information of trace table 200 may vary according to the particular application. During execution of application program 190, OS 180 may track the number of traces taken. Row 9 of trace table 200 indicates a trace parameter of "NUMBER OF TRACES TAKEN" in column 220, and a corresponding trace parameter data value of "25" in column 230. In this example, 180 captured 25 traces so far up to a particular point in time of application program 190 execution. The number of traces taken, such as that of trace table 200 row 9 data, may increase as application program 190 continues execution and conducts more traces using the disclosed autolocktrace feature.

OS 180 may capture the number of traces taken for each particular lock. For example, lock 1 may correspond to lock A data. As shown in row 10, trace table 200 may include "LOCK 1 NUMBER OF TRACES" in column 220 and a corresponding trace parameter data value of "15" in column 230. In that case, the first lock trace that OS 180 records shows a number of traces taken of 15. For example, if the first lock trace that OS 180 captures of executing application program 190 is lock A, the number of lock traces taken for lock A is equal to 15. That number may increase as OS 180 executes and continues to capture lock trace data for application program 190. As shown in row 10 through row 12 of trace table 200, OS 180 may capture lock 1 through lock L number of traces data, wherein L is the total number of traces captured. Row 11 of trace table 200 indicates a trace parameter of "LOCK 2 NUMBER OF TRACES" in column 220 and a corresponding trace parameter data vale of "10" in column 230. Trace table 200 row 12 indicates trace parameter "LOCK L NUMBER OF TRACES" in column 220 and a corresponding trace parameter data of "10" in column 230. In this example, OS 180 captures the number of lock traces for lock 1 through lock L during execution and performance evaluation of application program 190.

OS 180 may include other parameters for SMP locks within trace table 200 for either lock trace parameter input or output of the results of the disclosed SMP lock tracing method. OS 180 may use lock tracing input information from trace table 200 to determine parameters to affect the execution of lock tracing. This lock tracing input from trace table 200, such as row data 1 through row 5, shown by bracket 240 may reflect the arguments input by a system administrator or other user during entry of the autolocktrace command, as shown in Table 1 above. In contrast, OS 180 may use trace table 200 to store or otherwise record particular results of the disclosed SMP lock tracing method. For example, as shown in trace table 200 rows 6 through row 12, shown by bracket 250, OS 180 may record trace parameter data for application program 190 executing within SMP IHS 100. OS 180 may execute application program 190 or other program software for performance evaluation. System administrators, users, or other entities may use the results of the disclosed SMP lock tracing method, such as those of trace table 200, to provide input that maybe useful in achieving performance improvements of the application program 190.

FIG. 3 is a flowchart that shows the operation of OS 180 software during execution of application program 190 for the disclosed SMP lock tracing method. More specifically, the flowchart of FIG. 3 shows steps that a lock testing tool 300 within kernel 185 of OS 180 may take to conduct the disclosed testing method described above. The method starts, as per block 305. In one embodiment, a system administrator, user, or other entity uses SMP IHS 100 resources to perform lock tracing for a particular application software program, such as application program 190, via testing tool 300. Application program 190 may be a customer software application or other software application that requires software performance improvement or optimization. More particularly, application program 190 may be a particular customer application program, design test program, benchmark program, or other software that employs SMP thread or process locking during execution within SMP IHS 100.

A system administrator, software programmer, user or other entity initiates lock tracing within OS 180. In one embodiment, a user initiates or enables lock tracing, as per block 310. A user or other entity may initiate lock tracing by including an autolocktrace command line entry within OS 180, such as that of Table 1 above. This lock trace command entry may initiate through I/O device 150, manual command line entry within OS 180 software, or other method. During execution of application program 190 within SMP IHS 100, thread A obtains lock A, as per block 315. In other words, a particular process or thread, such as thread A executing within application program 190, requires a lock A and obtains temporary ownership of that lock A. For example, thread A may desire to access the address of information residing in SMP IHS 100 system memory 125 at memory address pointer A. While thread A is using that address pointer A information, OS 180 locks out other processes or threads from accessing address pointer A data. In that manner, OS 180 provides thread A with a lock A, namely a lock on memory address pointer A access.

Thread A may release the lock A after it no longer needs access to that information for read, write, or modify actions. However, other threads may require access to address A information prior to thread A releasing lock A. Thread A and thread B may share data or attempt the access of that shared data, such as memory address pointer A data of system memory 125. In another embodiment, OS 180 may map address pointers to registers, cache memory, hard drives or other memory sources of SMP IHS 100. During application program 190 execution, thread B requests lock A from OS 180, as per block 320. Because thread A already has lock A, OS 180 does not provide thread B with lock A. Thread B begins spinning i.e., waiting for lock A, as per block 325. In other words, thread B requires lock A and spins or holds while continuing to request lock A until it obtains lock A or another action occurs.

MAXSPIN identifies a particular threshold amount of time that a thread may wait for a particular lock, such as lock A prior to entering a sleep state. A thread, such as thread B, may or may not obtain a particular lock, such as lock A, within the time OS 180 associates with MAXSPIN for that thread and lock. Lock testing tool 300 of OS 180 performs a test to determine if thread B reaches MAXSPIN, as per block 330. In one case, thread B does not reach MAXSPIN and thread A releases lock A and thread B obtains lock A, as per block 335. In this example, OS 180 does not initiate a lock trace, as per block 340. On the other hand, OS 180 may determine that thread B reaches MAXSPIN while waiting for a thread A lock, as per block 330. In that case, thread B reaches MAXSPIN and OS 180 puts thread B to sleep, as per block 345.

Lock testing tool 300 of OS 180 performs a test to determine if the list of locks are met, as per block 350. In other words, OS 180 determines if the list of locks such as, the LOCKS TO TRACE as shown in row 1 of trace table 200 of FIG. 2 are met or valid. In one embodiment, if the list of locks are not met, as shown in trace parameter data column 230 and row 1 of trace table 200, OS 180 does not initiate a lock trace, as per block 340. In other words, OS 180 does not satisfy the lock trace objectives, such as the arguments shown in Table 1 above for the autolocktrace command, for execution of application program 190 in SMP IHS 100. Stated alternatively, testing tool 300 of OS 180 performs a test to determine if the particular thread reaching MAXSPIN, namely thread B per block 330 is included or excluded from a list of locks in trace table 200. If the test for the list of locks is met, OS 180 initiates a lock trace capture, as per block 370. For example, OS 180 may initiate a lock trace capture of lock A. During lock trace capture, OS 180 updates trace table 200, as per block 380. As shown in trace table 200, OS 180 may update a collection of trace parameter data, such as the data of rows 6 through 12, shown by bracket 250 for each trace and subsequent lock.

After OS 180 updates the trace table, as per block 380, or if OS 180 does not initiate a lock trace, as per block 340, the SMP automatic lock tracing method ends, as per block 390. Users or other entities may interrogate the trace table 200 trace parameter data to determine characteristics of locks for the purpose of improving performance of future application program 190 execution or other purposes. Trace table 200 may take many forms and multiple formats to contribute to application program 190 performance improvement or other uses. System administrators, or other entities may initiate the SMP lock tracing method with the autolocktrace command as shown in Table 1 or modifications of that command to achieve automatic lock tracing.

The foregoing teaches how an SMP IHS may employ the disclosed SMP lock tracing methodology to automatically capture SMP locks for threads that reach the threshold MAXSPIN. The OS may employ a kernel to automatically detect the MAXSPIN condition and initiate the disclosed lock tracing method without further user intervention. The lock tracing method may interrogate arguments set by the user during initiation of the disclosed SMP lock tracing method to determine eligibility for any particular lock trace capture. System administrators may employ the results of the SMP lock tracing method to better understand the SMP lock problems of a particular application program. System administrators or other entities may utilize the results of the SMP lock tracing method, such as those that the OS stores within a lock trace table to modify or otherwise improve upon the performance characteristics of the application program.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of testing, comprising:
   receiving, by a lock testing tool in a symmetric multiprocessing (SMP) information handling system (IHS), a trace buffer size as an argument of a lock trace command;
   allocating the trace buffer size, by the SMP IHS in response to the receiving by the lock testing tool the trace buffer size, wherein the trace buffer size represents the maximum amount of system memory allocated for the collection of lock trace data;
   receiving, by the lock testing tool in the SMP IHS, another lock trace command that exhibits an absence of lock data in another argument thereof;
   interpreting, by the lock testing tool, the absence of lock data in the another argument of the another lock trace command as a directive to perform a lock trace operation on all locks of an executing program;
   determining, by the lock testing tool when a particular thread of the executing program in the SMP IHS reaches a predetermined spin threshold; and
   commencing, by the lock testing tool, the lock trace operation in response to the particular thread reaching the predetermined spin threshold;
   wherein the lock testing tool receives as input a maximum number of traces to capture per time period in the lock trace operation.

2. The method of claim 1, wherein the particular thread waits to access a memory location because another thread exerts a first lock on the memory location.

3. The method of testing of claim 2, wherein the lock testing tool stores a list of locks designated for testing, the first lock being included in the list of locks.

4. The method of claim 3, further comprising:
   testing, by the lock testing tool, to determine if the first lock is included in the list of locks,
   such that the lock testing tool commences the lock trace operation when the particular thread reaches the predetermined spin threshold and the particular thread requests ownership of the first lock, provided the first lock is included in the list of locks.

5. The method of claim 1, wherein the lock testing tool initiates the lock trace operation provided that the particular thread has not exceeded a predetermined number of traces per time period.

6. An information handling system (IHS), comprising
   a symmetric multiprocessing (SMP) system,
   a memory coupled to the SMP system, the memory being configured with a lock testing tool that:
      receives a trace buffer size as an argument of a lock trace command;
   the memory being further configured with an operating system (OS) that:
      allocates the trace buffer size in response to a receiving by the lock testing tool, wherein the trace buffer size represents the maximum amount of system memory allocated for the collection of lock trace data;
   the memory being further configured with a lock testing tool that:
      receives another lock trace command that exhibits an absence of lock data in another argument thereof;
      interprets the absence of lock data in the another argument of the another lock trace command as a directive to perform a lock trace operation on all locks of an executing program;
      determines when a particular thread of the executing program in the SMP system reaches a predetermined spin threshold; and
      commences the lock trace operation in response to the particular thread reaching the predetermined spin threshold;
      wherein the lock testing tool receives as input a maximum number of traces to capture per time period in the lock trace operation.

7. The IHS of claim 6, wherein the particular thread waits to access a memory location because another thread exerts a first lock on the memory location.

8. The IHS of claim 6, wherein the memory is further configured with an operating system that includes the lock testing tool.

9. The IHS of claim 7, wherein the lock testing tool includes a list of locks designated for testing, the first lock being included in the list of locks.

10. The IHS of claim 9, wherein the lock testing tool tests to determine if the first lock is included in the list of locks, such that the lock testing tool commences the lock trace operation when the particular thread reaches the predetermined spin threshold and the particular thread requests ownership of the first lock, provided the first lock is included in the list of locks.

11. The IHS of claim 6, wherein the lock testing tool initiates the lock trace operation provided that the particular thread has not exceeded a predetermined number of traces per time period.

12. A computer program product stored on a non-transitory computer operable medium, comprising:
   instructions that receive by a lock testing tool in a symmetric multiprocessing (SMP) information handling system (IHS), a trace buffer size as an argument of a lock trace command;

instructions that allocate the trace buffer size, by the SMP IHS in response to the receiving by the lock testing tool, wherein the trace buffer size represents the maximum amount of system memory allocated for the collection of lock trace data;

instructions that receive by the lock testing tool in the SMP IHS, another lock trace command that exhibits an absence of lock data in another argument thereof;

instructions that interpret by the lock testing tool, the absence of lock data in the another argument of the another lock trace command as a directive to perform a lock trace operation on all locks of an executing program;

instructions that determine when a particular thread of the executing program in the SMP IHS reaches a predetermined spin threshold; and instructions that commence the lock trace operation in response to the particular thread reaching the predetermined spin threshold;

wherein the lock testing tool receives as input a maximum number of traces to capture per time period in the lock trace operation.

13. The computer program product of claim 12, wherein the particular thread waits to access a memory location because another thread exerts a first lock on the memory location.

14. The computer program product of claim 13, further comprising instructions that store a list of locks designated for testing, the first lock being included in the list of locks.

15. The computer program product of claim 14, further comprising instructions that test to determine if the first lock is included in the list of locks, such that the lock trace operation commences when the particular thread reaches the predetermined spin threshold and the particular thread requests ownership of the first lock, provided the first lock is included in the list of locks.

16. The computer program product of claim 12, further comprising instructions that initiate the lock trace operation provided that the particular thread has not exceeded a predetermined number of traces per time period.

\* \* \* \* \*